W. J. WILCOX.
MILK STRAINER.
APPLICATION FILED JAN. 28, 1921.
1,413,442.
Patented Apr. 18, 1922.
2 SHEETS—SHEET 1.
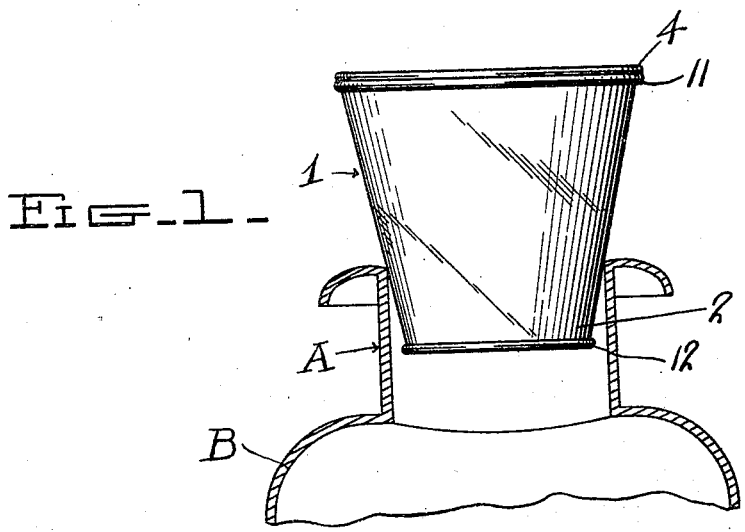
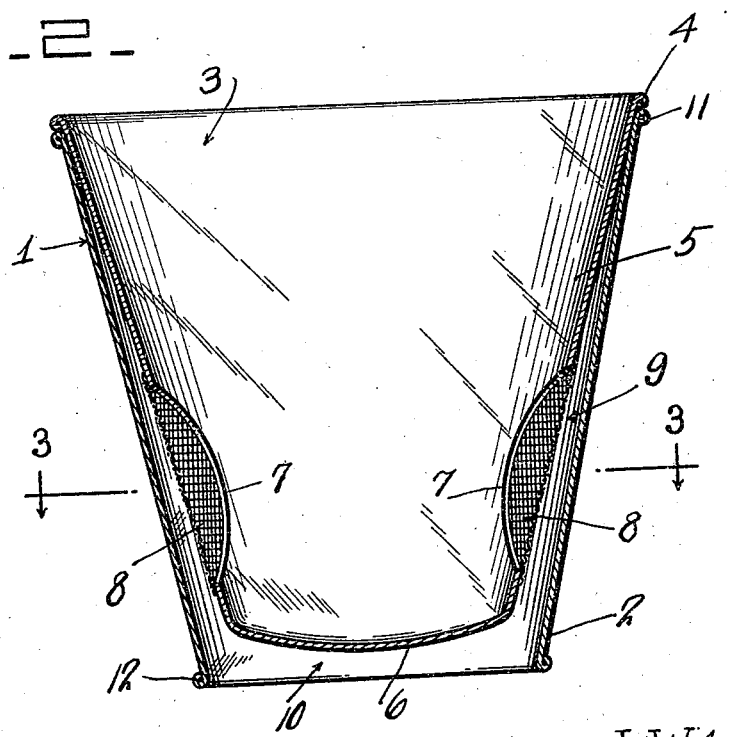
Inventor
William J. Wilcox W. J. WILCOX.
MILK STRAINER.
APPLICATION FILED JAN. 28, 1921.
1,413,442.
Patented Apr. 18, 1922.
2 SHEETS—SHEET 2.
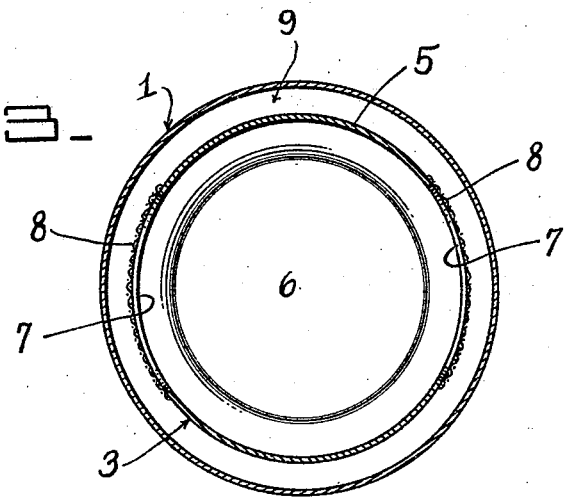
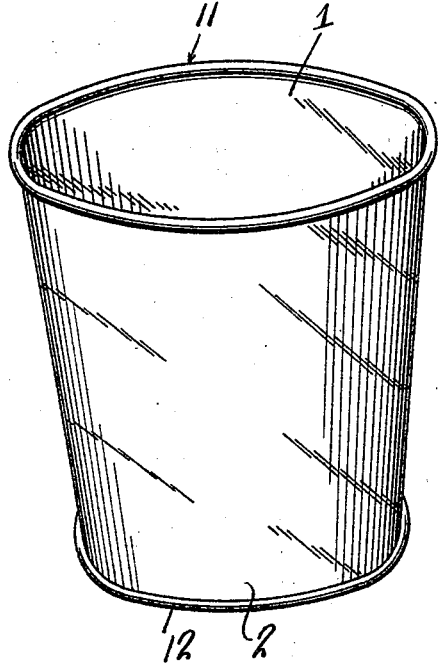
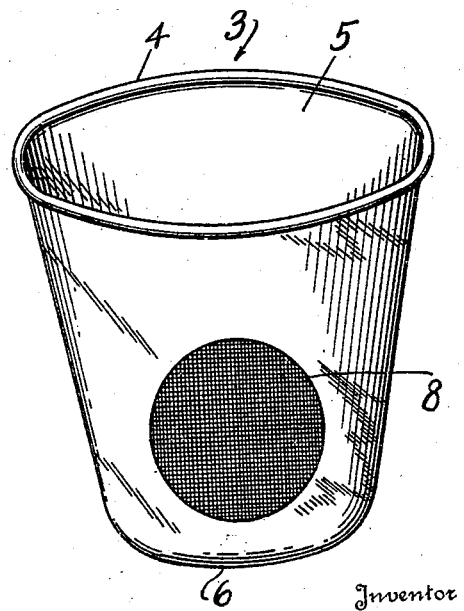
Inventor
William J. Wilcox

UNITED STATES PATENT OFFICE.

WILLIAM J. WILCOX, OF NEW HAMPTON, NEW YORK.

MILK STRAINER.

1,413,442. Specification of Letters Patent. Patented Apr. 18, 1922.

Application filed January 28, 1921. Serial No. 440,738.

*To all whom it may concern:*

Be it known that I, WILLIAM J. WILCOX, a citizen of the United States, residing at New Hampton, in the county of Orange and State of New York, have invented certain new and useful Improvements in Milk Strainers, of which the following is a specification.

This invention relates to new and useful improvements in milk strainers.

The invention has for its object, primarily, to provide a device of this character which is simple and economical in construction and whereby the milk is more readily and thoroughly strained of dirt, hair, chaff or other foreign matter and hence, a great advantage over strainers of the old type.

A further important object of my invention is to so form or construct the strainer that the dirt or other foreign matter in the milk is allowed to readily settle and collect in the bottom of the strainer, thus allowing the milk to flow freely into the milk can.

With the foregoing and other objects in view that will readily appear as the nature of the invention is better understood, the same consists in the novel features of construction, combination and arrangement of parts illustrated in the drawings and more particularly pointed out in the appended claims.

In the accompanying drawings, which are for illustrative purposes only and are therefore not drawn to scale and in which like parts are designated by like reference characters throughout the several views:—

Fig. 1 is a side elevation, showing my improved strainer mounted in the neck of the ordinary milk can, the latter shown in section.

Fig. 2 is a vertical transverse sectional view, of the strainer.

Fig. 3 is a horizontal section, taken on line 3—3 of Fig. 2.

Fig. 4 is a detail perspective view of the funnel and Fig. 5 is a similar view of the strainer proper.

In carrying out my invention, I employ an outer downwardly tapered member or funnel 1 designed for use in filling cans, especially of the type hereinbefore referred to, such use or application being apparent from Fig. 1, wherein the tapered end 2 of the funnel is shown inserted in the neck A of the milk can B.

The strainer proper, which fits within the funnel 1, and is designated as 3, comprises a cylindrical preferably re-inforced upper edge 4, a downwardly tapered body 5 and closed bottom 6. In carrying out my invention, the body portion 5 of the strainer is provided in opposite sides, at points somewhat above the bottom 6, with preferably circular openings 7 covered with corresponding strips or pieces of wire gauze 8 or other reticulated material, of the requisite fineness of mesh, particularly for straining milk, as will be readily appreciated.

The bottom 6 of the strainer, besides other purposes, serves as a trough or receptacle to collect any sediment or other foreign matter retained or withheld by the strainer. It will be noted that the flare or taper of the body portion of the strainer proper is somewhat greater than that of the funnel to provide an annular space 9 of gradually increasing width from the top to the bottom of the strainer, resulting in an increased or greater flow or quantity of the strained milk into the funnel and accordingly the milk can than would otherwise be the case, as is apparent. With this end in view, the strainer is made somewhat shorter than the outside member or funnel, as shown more particularly in Fig. 2, leaving a horizontal space 10 below the bottom 6 of the strainer, which extends entirely across the funnel. The top as well as the bottom edge of the funnel may be provided with a bead or re-inforcement 11 and 12, respectively, to add greater strength and durability at these points.

The mounting or positioning of the strainer proper within the outer member or funnel, serves as a guard against contact of the strained milk as it leaves the strainer with the milk can neck and the outside air, thus rendering this part of the filling operation more sanitary and also providing, as above stated, for the increased filling capacity of the funnel.

From the foregoing description taken in connection with the drawings, it is thought that the construction, operation and advantages of my invention will be readily understood without requiring a more extended explanation.

Having described my invention, what I claim as new and desire to secure by Letters Patent, is:—

1. A milk strainer of the type described, comprising a downwardly tapered funnel adapted to fit in a milk can neck and a downwardly tapered strainer proper mounted in the funnel, said strainer comprising a closed or imperforate bottom and provided in opposite sides, adjacent said bottom, with strips or pieces of wire gauze or other reticulated material, the flare or taper of the strainer proper being greater than that of the funnel to provide an annular space between the funnel and strainer of gradually increasing width from the top to the bottom of the latter, substantially as and for the purpose specified.

2. A milk strainer of the type described, comprising a downwardly tapered funnel adapted to fit in a milk can neck and a downwardly tapered strainer proper mounted in the funnel, said strainer comprising a closed or imperforate bottom and provided in opposite sides, adjacent and somewhat near said bottom, with strips or pieces of wire gauze or other reticulated material, the flare or taper of the strainer being greater than that of the funnel to provide an annular space between the funnel and strainer of gradually increasing width from the top to the bottom of the latter, the strainer being shorter than the funnel whereby a horizontal space is left below the bottom of the strainer which extends entirely across the width of the funnel, substantially as and for the purpose specified.

In testimony whereof I affix my signature.

WILLIAM J. WILCOX.